Jan. 4, 1955
J. W. JAGERSBERGER
2,698,613
FUEL-AIR MIXTURE INDUCTION SYSTEM FOR
INTERNAL-COMBUSTION ENGINES
Filed Nov. 16, 1950
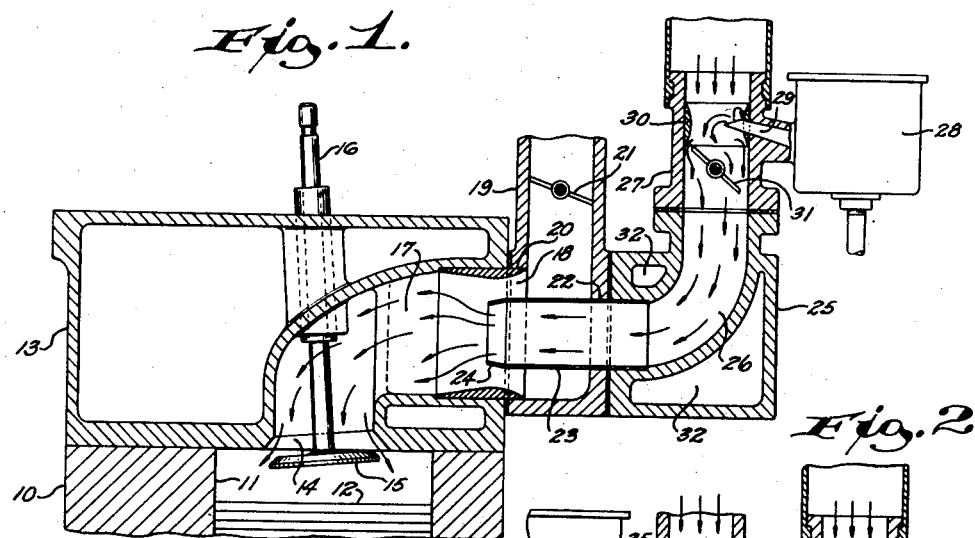
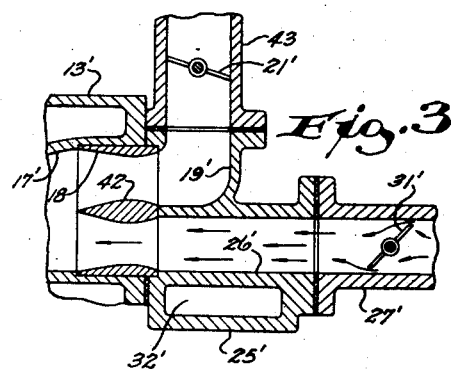
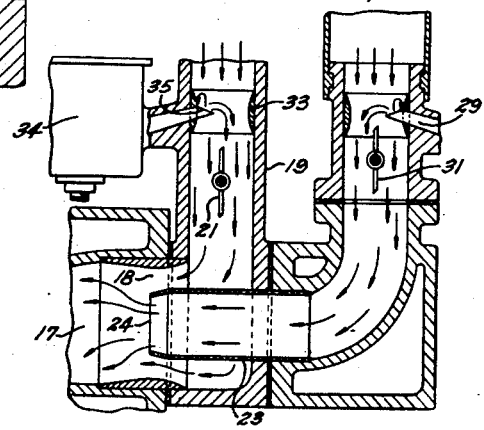
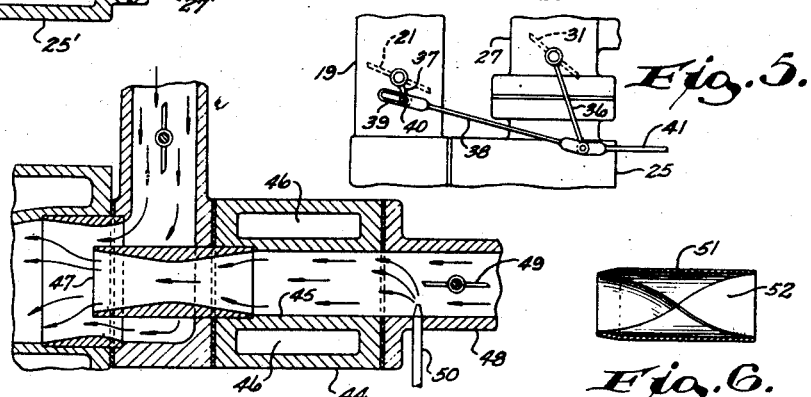
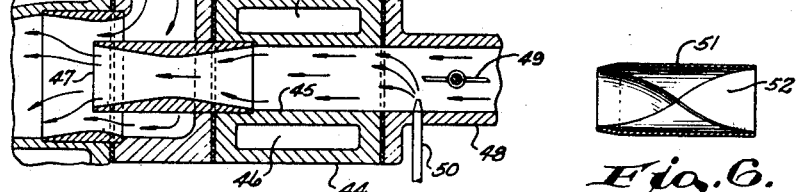
INVENTOR.
Joseph W. Jagersberger,
BY
Morsell & Morsell
ATTORNEYS.

United States Patent Office 2,698,613
Patented Jan. 4, 1955

2,698,613

FUEL-AIR MIXTURE INDUCTION SYSTEM FOR INTERNAL-COMBUSTION ENGINES

Joseph W. Jagersberger, Racine, Wis., assignor to Rajo Automotive Research Corp., Milwaukee, Wis., a corporation of Wisconsin Application November 16, 1950, Serial No. 196,007

3 Claims. (Cl. 123—119)

This invention relates to improvements in fuel-air mixture induction systems for internal combustion engines.

Research and development in the internal combustion field has long been directed toward the production of an internal combustion engine which, when embodied in an automobile, uses a relatively small amount of fuel and yet has ample power in terms of acceleration and hill climbing ability. Present-day fuel induction systems are not entirely satisfactory because of the fact that the features heretofore embodied therein to improve part throttle operation have required a sacrifice of full throttle power. A comparison of part throttle operational requirements with those of full throttle operation indicates a conflict which cannot be resolved with the induction systems heretofore developed.

For most efficient part throttle operation the fuel-air mixture should be heated to the highest possible temperature to insure vaporization of the fuel. At full throttle, however, the heat which is applied to the mixture in present-day engines far exceeds the most efficient full throttle heat, and the devices used today do not provide sufficiently quick transition from a hotter to a cooler charge, thus lowering the volumetric efficiency of the engine and causing detonation. Most present-day carburetors provide a 30% richer mixture at throttle openings above three-quarters in order to provide internal cooling at these throttle openings. This is obviously an inefficient and expensive method of cooling, but this additional cooling is necessary in order to hold the temperature within operational limits. Since a high temperature is most desirable at part throttle operation, it is obvious that internal cooling must be at a minimum during part throttle operation.

Another prerequisite for the attainment of maximum efficiency at part throttle operation is the creation of the highest possible mixture velocity in order to produce maximum turbulence. High turbulence further aids vaporization and insures a relatively low ignition lag. In combination with the previously mentioned heating feature, this makes possible the use of leaner mixture ratios, since all of the fuel is thereby converted into useful work. At full throttle operation, however, a low intake velocity is desirable in order to prevent an undesirable increase in the rate of pressure rise due to combustion chamber turbulence. Excessively rapid acceleration in the rate of pressure rise results in combustion shock which must be maintained at a minimum for best operation.

In present-day engines high mixture velocity is made possible by the employment of induction passages of relatively small diameter. While these small passages are advantageous for operation at part throttle speeds, they prevent free breathing of the engine at full throttle (thereby causing substantial pumping losses) and decrease the volumetric efficiency, both of which are accompanied by a corresponding decrease in the engine output.

With the above in mind it is a general object of the present invention to provide an improved fuel-air mixture induction system for internal combustion engines which provides increased economy of operation while at the same time providing higher engine output and better all-around performance throughout the entire speed range.

A further object of the invention is to provide an improved fuel-air induction system of the class described having embodied therein a dual induction system rather than the conventional single intake manifold found on present-day cars, the primary manifold of the improved dual induction system supplying a heated fuel-air mixture to the cylinder for operation at part throttle speeds, and the secondary manifold of said system supplying to the cylinder at speeds above half throttle unheated air or fuel-air mixture in addition to the mixture from the primary manifold.

A further object of the invention is to provide an improved fuel-air induction system of the class described wherein the primary manifold is heated by an exhaust jacket, whereas the secondary manifold is unheated and is of ample size to insure free breathing of the engine at any speed above the half throttle opening, thereby cutting down pumping losses and turbulence while at the same time providing internal cooling and increased volumetric efficiency without the use of excessively rich mixtures for cooling purposes.

A further object of the invention is to provide an induction system of the class described wherein the primary manifold thereof is of a size which imparts a high velocity to the charge passing therethrough whereby maximum efficiency at speeds less than half throttle is attained by induction of a heated mixture through the primary manifold alone.

A further object of the invention is to provide an improved induction system of the class described wherein the secondary manifold is provided with suitable valve means which is actuated upon advancement of the throttle beyond the half throttle speed setting to permit induction through both the primary and the secondary manifolds, said valve means being closed to prevent induction through the secondary manifold at speeds of less than half throttle.

A further object of the invention is to provide an improved induction system of the class described which is adapted for use with present-day carburetors and other fuel-air mixing devices, one of said mixing devices being connected to the primary manifold, and, if desired, another of said mixing devices may be connected to the secondary manifold.

A further object of the invention is to provide an improved induction system wherein the primary and secondary manifolds communicate with the cylinder through an intake port of sufficient size to readily accommodate the mixtures flowing therethrough from both the primary and secondary manifolds.

A further object of the invention is to provide an improved induction system of the class described which is simple in construction and which may be incorporated into either new engines or engines now in use without mechanical complications.

With the above and other objects in view, the invention consists of the improved fuel-air induction system, and all of its parts and combinations as set forth in the claims, and all equivalents thereof.

In the drawing accompanying and forming a part of this specification wherein are shown several forms of the invention, and wherein like characters of reference indicate the same parts in all of the views:

Fig. 1 is a fragmentary transverse vertical sectional view taken through an engine having embodied therein one form of the improved fuel-air induction system and showing a fuel-air mixture flowing into the engine through the primary manifold;

Fig. 2 is a fragmentary vertical sectional view similar to Fig. 1 only showing a modified form of the invention having a carburetor connected to the secondary manifold, and showing a fuel-air mixture being inducted through said secondary manifold as well as through the primary manifold;

Fig. 3 is a fragmentary transverse vertical sectional view taken through an engine wherein the primary and secondary manifolds are formed in a single casting and communicate with the cylinder inlet through a single partitioned sleeve;

Fig. 4 is a fragmentary transverse vertical sectional view taken through an engine embodying therein another form of the invention and showing the use of a pressure fuel jet in lieu of a carburetor, as well as the use of a venturi type jet tube at the discharge end of the primary manifold;

Fig. 5 is a fragmentary side view showing one form of lost motion linkage which may be used for actuating the primary and secondary manifold valves in all forms of the invention; and Fig. 6 is a longitudinal sectional view taken through a modified form of jet tube adapted to be used in lieu of the jet tubes at the discharge end of the primary manifold in Figs. 1, 2 and 4.

Referring more particularly to Fig. 1 of the drawing, the numeral 10 indicates an engine block formed with a cylinder 11 in which a piston 12 is slidably reciprocatably positioned. The numeral 13 indicates a cylinder head which is positioned on the block 10. The head 13 is formed with an inlet valve opening 14 which preferably has a diameter larger than half the diameter of the cylinder 11. An inlet valve 15 has a stem 16 which is mounted in a suitable bearing in the head 13 for axial reciprocating movement, said valve being positioned to close the valve opening 14 in one position.

A generally L-shaped inlet passage or mixing chamber 17 is formed in the head 13 and communicates between the valve opening 14 and a side wall of the head. A venturi type, preferably circular sleeve 18 may be positioned in the mouth of the passage 17 to project outwardly a short distance from the head 13, as shown. A hollow secondary manifold 19 is suitably secured to the side wall of the head 13 in the position shown in Fig. 1 and is formed with an aperture 20 for snugly receiving the projecting end of the sleeve 18. The interior of manifold 19 thus communicates with the interior of the sleeve 18. The internal diameter of the most restricted portion of the venturi tube 18 is preferably at least as great as the diameter of the valve opening 14.

The outer wall of the manifold 19 is formed with an aperture 22 which is preferably coaxial with the aperture 20. A cylindrical jet tube 23 is snugly received in the aperture 20 and extends axially of said aperture and of the sleeve 18. The tube 23 may have a discharge end portion 24, of restricted diameter and said discharge end is preferably positioned within the sleeve 18 adjacent the portion of said sleeve having the minimum internal diameter. The opposite end of the jet tube 23 projects outwardly of the outer wall of the manifold 19 as shown.

Bolted or otherwise suitably secured to the outer wall of the secondary manifold 19 is a primary manifold 25 having an arcuate passage 26 formed therein, one end of said passage snugly receiving the projecting portion of the jet tube 23. Fixed to the primary manifold 25, at the other end of the passage 26, is a conduit 27 which is provided with a fuel-air mixing device such as a carburetor 28 having a fuel jet 29 and a venturi sleeve 30. The conduit 27 is also provided with a butterfly type valve 31. The upper end of the conduit 27 communicates with a source of under-the-hood air, such as that from an air cleaner or the like. Similarly, the upper end of the secondary manifold 19 may communicate with a source of under-the-hood air or air at ambient temperature. The primary manifold is formed with exhaust gas passages 32 surrounding the passage 26, the heat from said gases heating the walls of the passage 26.

In Fig. 2 a modified form of the invention is shown wherein the secondary manifold 19 is provided with a fuel-air mixing device such as a carburetor 34 having a fuel jet 35 and a venturi sleeve 33.

Referring to Fig. 5, a linkage for operating the butterfly valves 21 and 31 may include an arm 36 fixed to the shaft of the butterfly valve 31 externally of the conduit 27. A similar but shorter arm 37 may be fixed to the shaft of the butterfly valve 21 externally of the secondary manifold 19. A link 38 is pivotally connected at one end to the arm 36 and is formed at its opposite end with an elongated slot 39 in which is slidably received a pin 40 carried by the outer end of the arm 37. A link or rod 41 is pivotally connected to the arm 36 and to the link 38 as shown, and may be connected to the engine throttle or accelerator (not shown).

The link 38 provides a lost motion connection between the arms 36 and 37, whereby the butterfly valve 31 can be moved to approximately half throttle opening, as shown in Figs. 1 and 5, without any movement being imparted to the butterfly valve 21. Any movement of the link 41 to the left beyond the position thereof shown in Fig. 5 results in the valve 21 being opened relatively rapidly. The arms 36 and 37 are of such length and are so disposed that movement of the valve 31 from the position shown in Figs. 1 and 5 to the position shown in Fig. 2 results in movement of the valve 21 from the closed position shown in Figs. 1 and 5 to the wide open position shown in Fig. 2.

In normal part throttle operation of either of the forms of the invention shown in Figs. 1 and 2, the butterfly valve 31 is partially open, as shown in Fig. 1, and a fuel-air mixture is inducted through the passage 26, the jet tube 23, the passage 17 and the valve opening 14 into the cylinder 11. As the mixture flows through the heated passage 26 its temperature is greatly increased. The diameter of the jet tube 23 is sufficiently small as compared with the displacement of the piston 12 to impart a high velocity to the heated mixture as it flows therethrough. It is apparent therefore, that at part throttle speeds a high temperature mixture of high turbulence is inducted into the cylinder 11, thereby providing high efficiency and permitting the use of lean mixtures, while at the same time providing smooth operation.

As the accelerator or throttle is advanced beyond approximately half throttle setting to cause the engine to run as a correspondingly higher speed, the lost motion linkage opens the butterfly valve 21 to permit induction through the secondary manifold 19 of either air (in the form of the invention shown in Fig. 1) or a fuel-air mixture, (in the form of the invention shown in Fig. 2), depending upon the form of the invention used. It will be noted that no means is provided for heating the secondary manifold 19, and therefore the air or fuel-air mixture being inducted therethrough is at or below the ambient temperature. The air or mixture flowing through the manifold 19 flows through the venturi sleeve 18 around the discharge end 24 of the jet tube 23 and the charge from said jet tube becomes thoroughly disbursed in the secondary air or mixture.

The relatively large size of the valve opening 14 and the passage 17 and the increased air or mixture supplied by the secondary manifold 19 when the valve 21 is opened permits free breathing of the engine. Additionally, the relatively cool air or fuel-air mixture inducted through the secondary manifold provides effective internal cooling of the engine without the need of excessively rich mixtures for this purpose. The free breathing of the engine permitted by the larger induction passages and the secondary manifold 19 also permits induction of the mixtures into the cylinder 11 at relatively low velocity, thereby cutting down turbulence and avoiding combustion shock. A further advantage of the relatively cool air or fuel-air mixture inducted through the secondary manifold 19 is that it increases the volumetric efficiency of the engine.

It is apparent from the foregoing that the improved dual induction system provides high part throttle efficiency and smooth part throttle operation with no sacrifice in full throttle power or acceleration. The improved induction system provides higher engine output and better all-around performance throughout the entire speed range. The improved design makes possible the use of larger intake valve openings than have heretofore been practical, said large valve openings in the improved induction system having no detrimental effect upon part throttle operation, due to the fact that the jet tube 23 imparts the necessary part throttle high velocity to the charge inducted through the primary manifold. Large intake valve openings have heretofore been unsatisfactory because at low speeds the velocity of the charge was not great enough and poor operation resulted. The improved induction system avoids this difficulty.

A modified form of the invention is shown in Fig. 3 wherein the primary and secondary manifolds are formed in a single casting 25'. The casting 25' is formed with a passage 26' and with a passage 19'. The cylinder head 13' is formed with a passage 17' in the mouth of which is positioned a venturi sleeve 18' formed with a diametrically extending partition 42. The secondary manifold passage 19' communicates with the sleeve 18 on one side of the partition 42, whereas the passage 26' communicates with the sleeve 18 on the other side of the partition 42 as shown. The casting 25' is formed with an exhaust gas jacket 32' for heating the walls of the passage 26'.

A conduit 43 communicates with the passage 19' and with a suitable source (not shown) of air or fuel-air mixture at ambient temperature. A butterfly valve 21' is mounted in the conduit 43 and controls the flow of air or mixture therethrough. A conduit 27' communicates with the passage 26' as shown and is preferably connected to a carburetor (not shown). A butterfly valve 31' is mounted in the conduit 27' for controlling the flow of fuel-air mixture therethrough.

The operation of the form of the invention shown in Fig. 3 is substantially identical with that of the form of the invention shown in Figs. 1 and 3, the valves 21' and 31' being connected by a lost motion linkage (not shown) similar to that shown in Fig. 5.

In Fig. 4 another form of the invention is shown wherein a primary manifold 44 has a straight passage 45 therethrough. The manifold 44 is also formed with exhaust gas passages 46 to heat the walls of the passage 45. A venturi type jet tube 47 is used in lieu of the straight wall type tube 23 shown in Figs. 1 and 2. A conduit 48 communicates with the outer end of the passage 45 of the manifold 44, and pivotally mounted therein is a butterfly valve 49. Extending through the wall of the conduit 48 adjacent the butterfly valve 49 is a pressure fuel jet 50 which may be used in lieu of the carburetor 28 shown in Fig. 1. The operation of the form of the invention shown in Fig. 4 is similar to that of the form of the invention shown in Fig. 1.

Another type of jet tube 51 is shown in Fig. 6. This is similar to the jet tubes 23 shown in Figs. 1 and 2, but has mounted therein an axially twisted ribbon 52 of substantially the same width as the internal diameter of the tube 51. The twisted ribbon 52 causes the mixture flowing through the tube 51 to travel in a helical path, thereby increasing the turbulence of the charge and further aiding the vaporization of all portions of the charge. The jet tubes 23, 47 and 51 may be used in any of the forms of the invention shown in Figs. 1, 2 and 4 in accordance with requirements.

Various changes and modifications may be made without departing from the spirit of the invention, and all of such changes are contemplated as may come within the scope of the claims.

What I claim as new is:

1. In a dual fuel-air mixture induction system for an internal combustion engine formed with a cylinder: walls defining a venturi inlet port in communication with said cylinder; a first conduit having a discharge end of smaller diameter than the portion of smallest diameter of said venturi, said discharge end being positioned substantially axially within said inlet venturi at the smallest diameter portion thereof; means for supplying a heated fuel-air mixture to said first conduit; means in said first conduit for causing helical flow of said mixture therein; a valve for controlling the flow of said fuel-air mixture through said first conduit; a second conduit communicating with said inlet port around the discharge end of said first conduit and with a source of air at ambient temperature; and a valve for controlling the flow of said air through said second conduit.

2. In an internal combustion engine formed with a cylinder: walls defining an inlet valve port communicating with said cylinder; walls defining a first passage communicating with said valve port; means for supplying a fuel-air mixture to said first passage; valve means in said first passage for controlling the flow of said fuel-air mixture through said first passage; walls defining a second passage in communication with said valve port and also in free communication with the ambient atmosphere, said first and second passages being non-communicating except at said valve port; valve means in said second passage for controlling the flow of air through said second passage; and means in said first passage for causing helical flow of the fuel-air mixture therethrough.

3. In an internal combustion engine formed with a cylinder: walls defining an inlet valve port communicating with said cylinder; walls defining a first passage communicating with said valve port; means for supplying a fuel-air mixture to said first passage; means for heating the fuel-air mixture supplied to said first passage; a valve in said first passage for controlling the flow of said fuel-air mixture through said first passage; walls defining a second passage in communication with said valve port, said first and second passages being non-communicating except at said valve port; means separate from said first-mentioned fuel-air mixture supplying means for supplying an unheated mixture of the same kind of fuel and air to said second passage; and a valve in said second passage for controlling the flow of fuel-air mixture through said second passage.

References Cited in the file of this patent

UNITED STATES PATENTS

| | | |
|---|---|---|
| 1,014,328 | Podlesak | Jan. 9, 1912 |
| 1,071,003 | Drayton et al. | Aug. 19, 1913 |
| 1,213,817 | Baruch | Jan. 30, 1917 |
| 1,542,823 | Manville | June 23, 1925 |
| 1,635,460 | Cornwell | July 12, 1927 |
| 1,867,457 | Ishikawa | July 12, 1932 |
| 2,038,157 | Aseltine et al. | Apr. 21, 1936 |
| 2,638,330 | Morgenroth | May 12, 1953 |

FOREIGN PATENTS

| | | |
|---|---|---|
| 804,716 | France | Aug. 10, 1936 |
| 113,635 | Australia | Aug. 8, 1941 |
| 40,132 | Holland | Sept. 15, 1936 |